Figure 5:
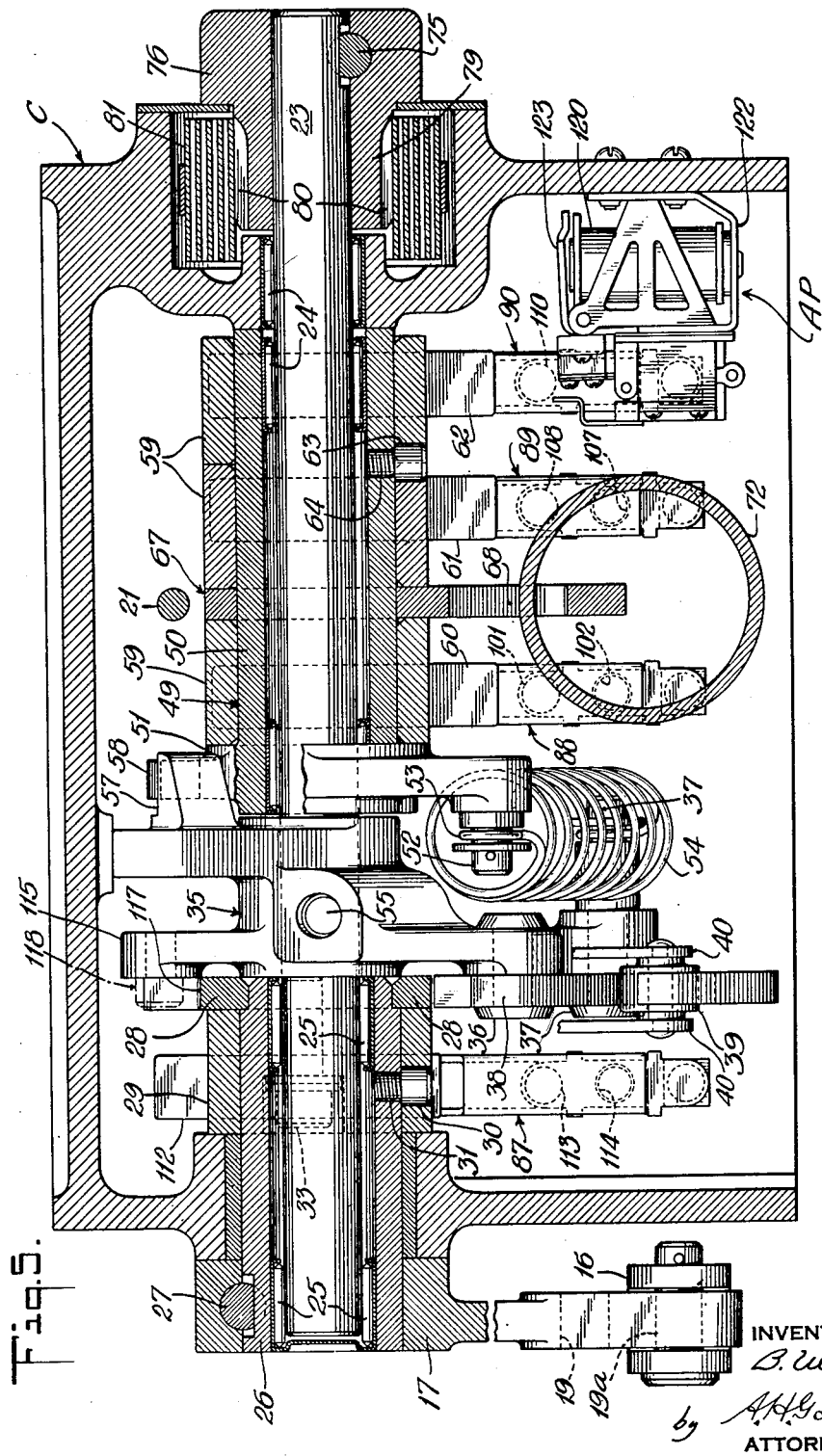

March 24, 1953 B. I. ULINSKI 2,632,819
CONTROLLER
Original Filed Nov. 1, 1945 8 Sheets-Sheet 1
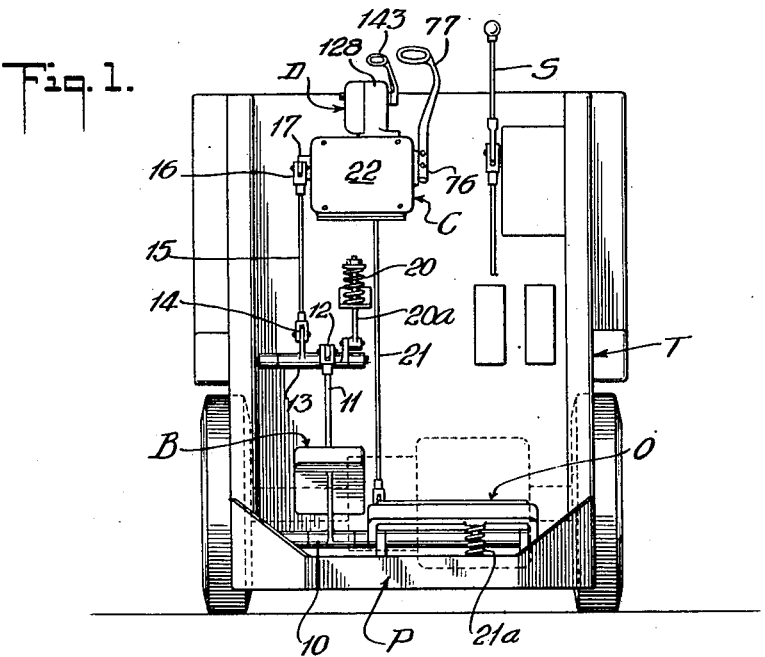
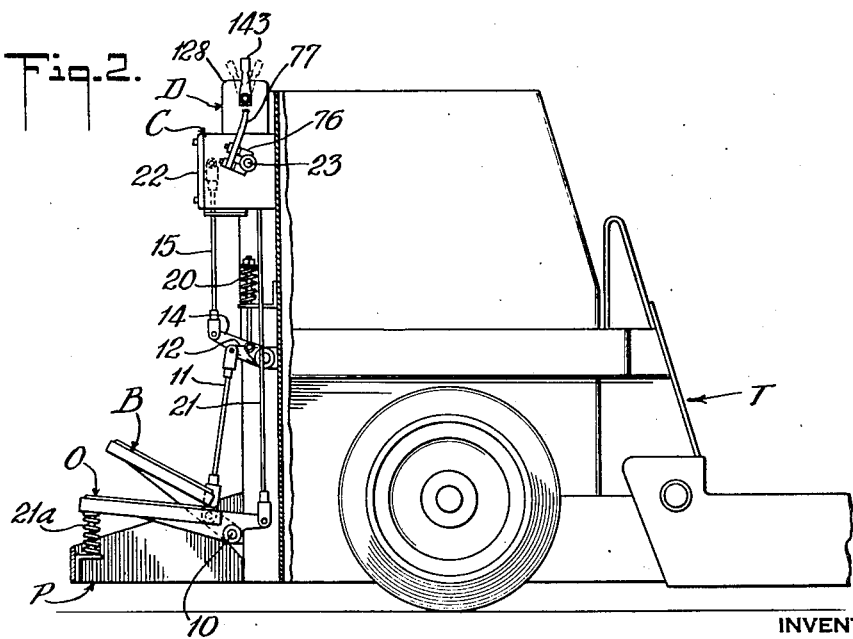
INVENTOR
B. Ulinski
BY A. H. Golden
ATTORNEY March 24, 1953 B. I. ULINSKI 2,632,819
CONTROLLER
Original Filed Nov. 1, 1945 8 Sheets-Sheet 2
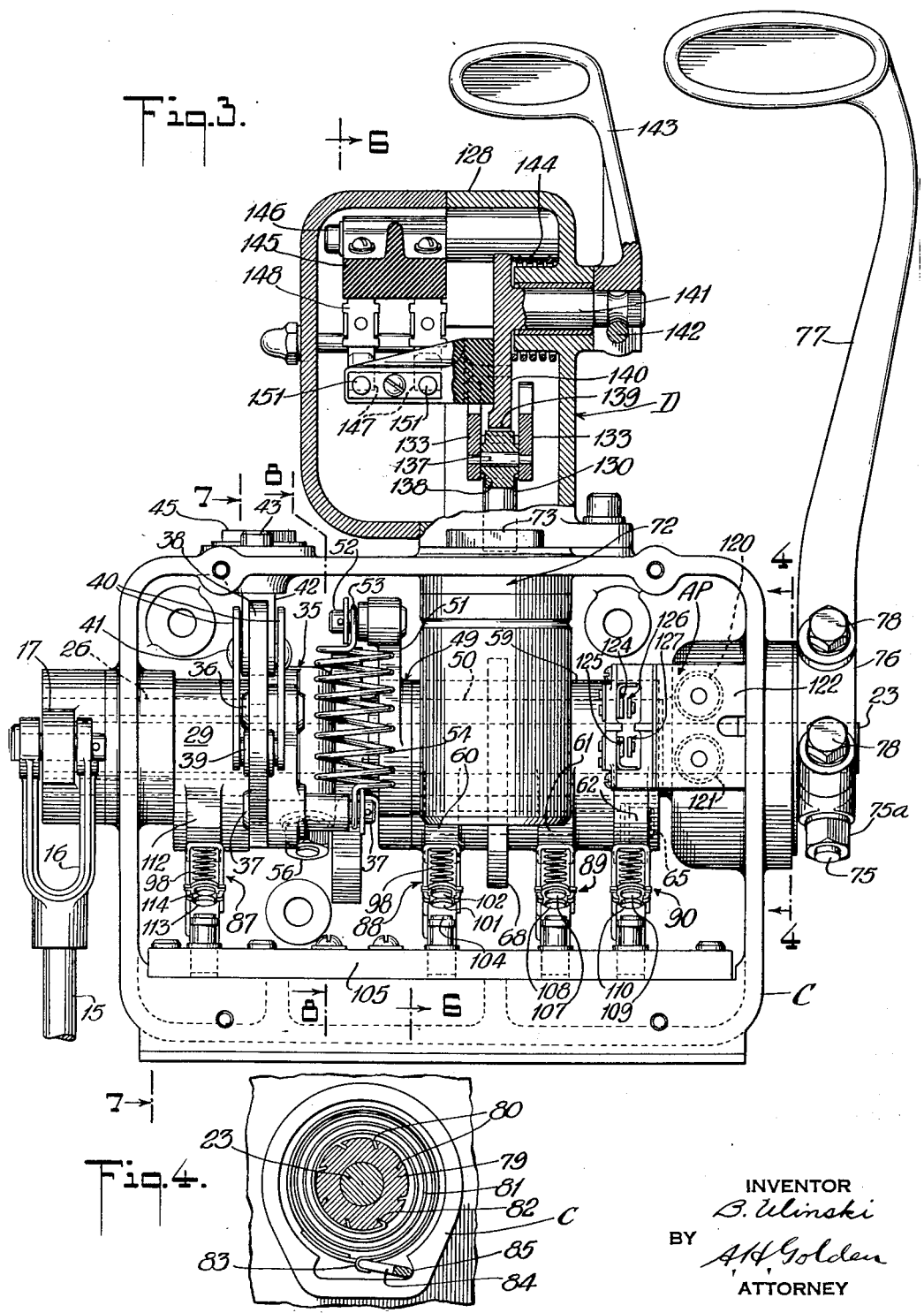
INVENTOR
B. Ulinski
BY A. H. Golden
ATTORNEY March 24, 1953 B. I. ULINSKI 2,632,819
CONTROLLER
Original Filed Nov. 1, 1945 8 Sheets-Sheet 3

INVENTOR
B. Ulinski
by A. H. Golden
ATTORNEY

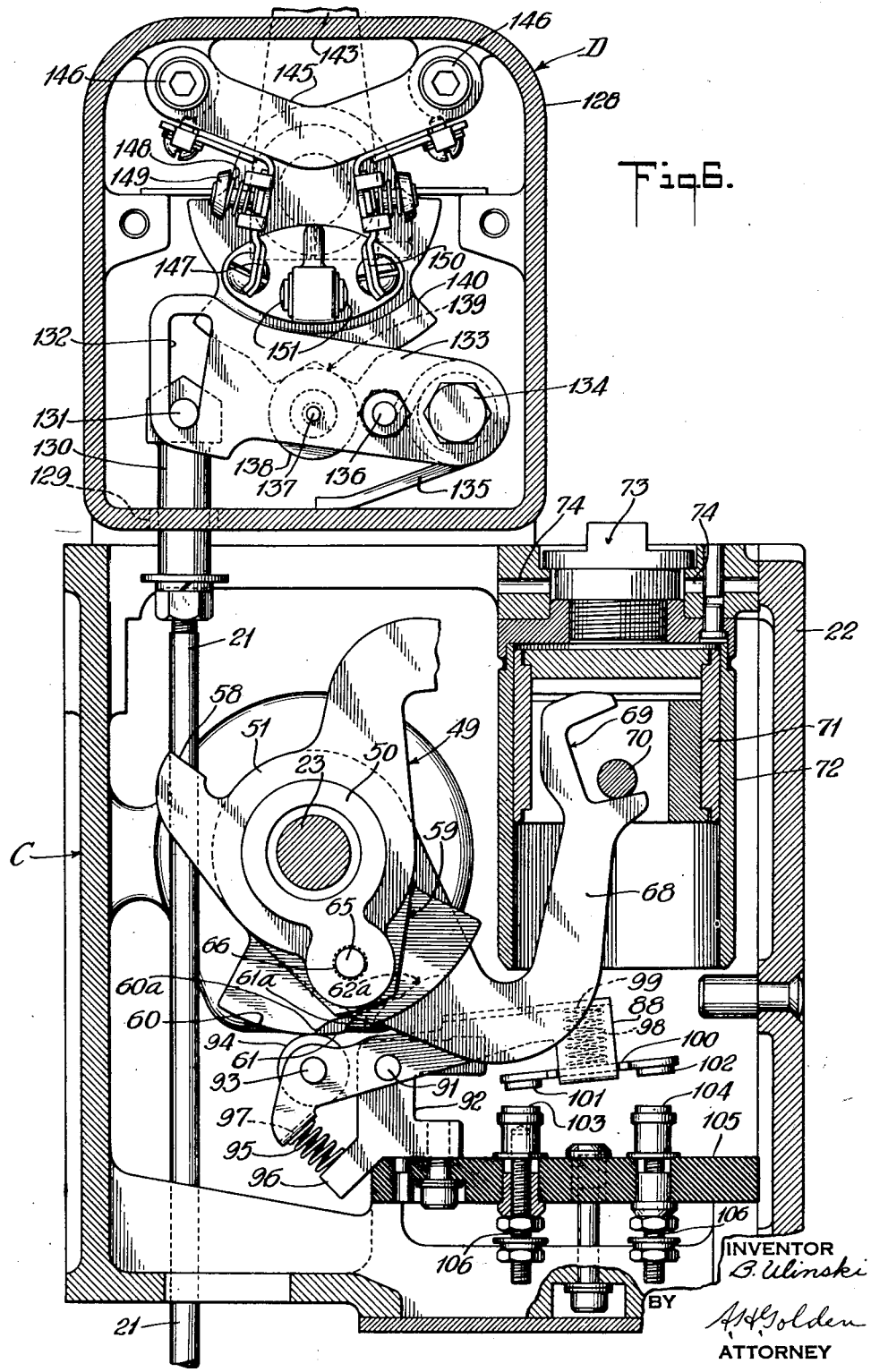

March 24, 1953     B. I. ULINSKI     2,632,819
CONTROLLER
Original Filed Nov. 1, 1945     8 Sheets-Sheet 5
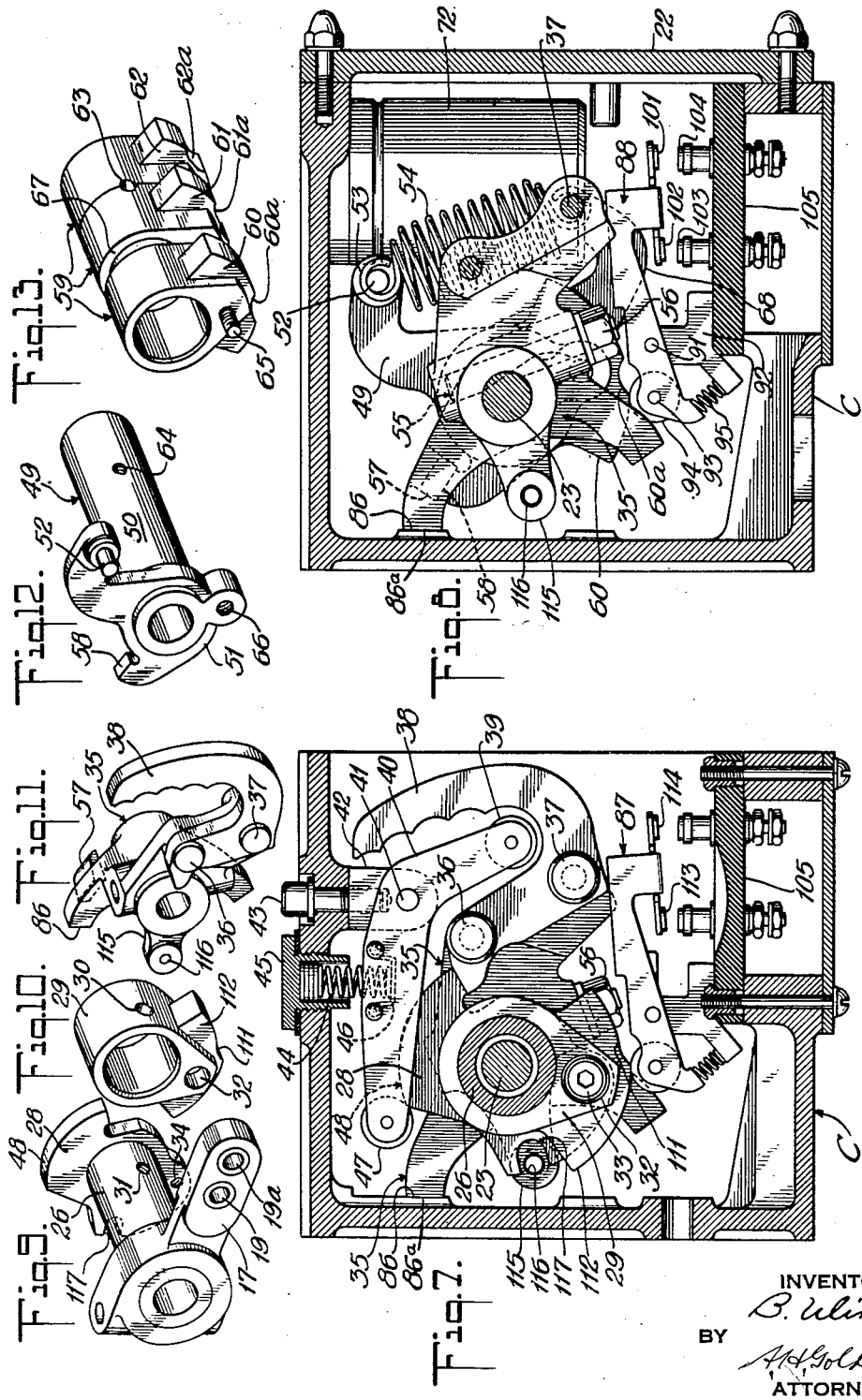
INVENTOR
B. Ulinski
BY
A. H. Golden
ATTORNEY March 24, 1953     B. I. ULINSKI     2,632,819
CONTROLLER Original Filed Nov. 1, 1945     8 Sheets-Sheet 6

INVENTOR
B. Ulinski
BY
H. H. Golden
ATTORNEY

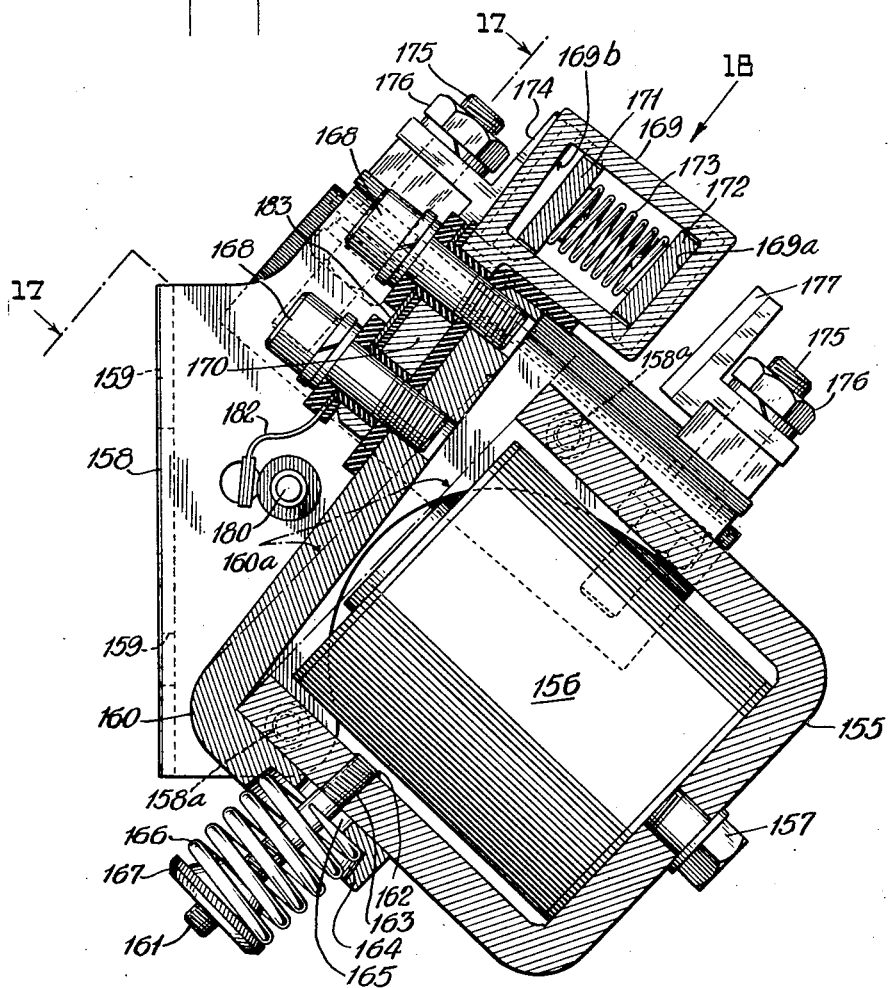

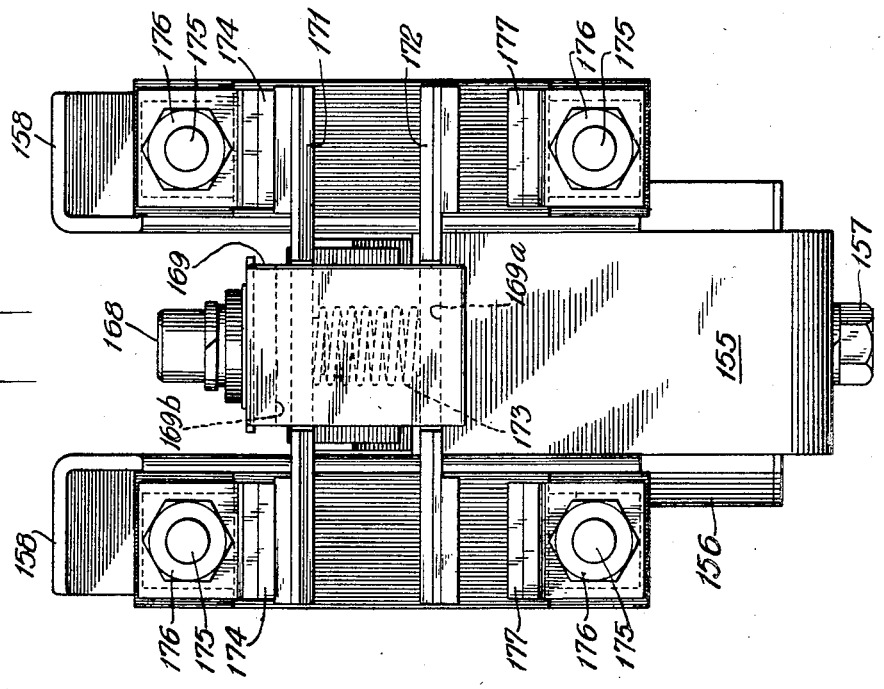
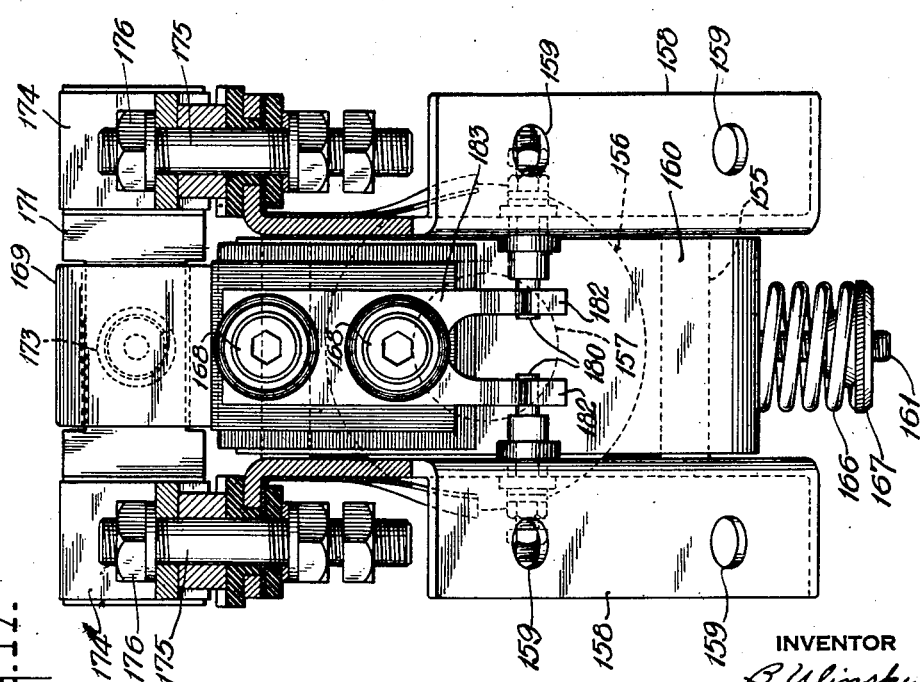

Patented Mar. 24, 1953

2,632,819

UNITED STATES PATENT OFFICE 2,632,819

CONTROLLER

Bronislaus I. Ulinski, Chicago, Ill., assignor to The Yale & Towne Manufacturing Company, Stamford, Conn., a corporation of Connecticut Original application November 1, 1945, Serial No. 626,118, now Patent No. 2,510,028, dated May 30, 1950. Divided and this application August 18,1947, Serial No. 769,207

13 Claims. (Cl. 200—34)

This application is a division of my application Serial No. 626,118 filed November 1, 1945 and relating to a motor circuit control adapted particularly for use with the motor of an electric industrial truck. The parent application issued on May 30, 1950 as Patent No. 2,510,028.

The invention of this application covers a new and novel means for operating a controller of a type that may be used in the motor circuit control of my application supra.

It is the object of my invention to contribute means whereby a controller may not be moved through its several speed positions without some pause in each speed. The art contains many patents in which this problem has been attacked and met by some particular design. I have conceived a most simple and effective structure in which the controller is actuated through the intermediary of intermediate means rather than directly, with timing means preferably controlling said intermediate means for preventing more than a predetermined rate of movement of the speed controller.

As a feature of my invention, the intermediate means may be energy storing means. Thus, energy may be stored in a spring or the equivalent thereof, and translated into movement of the controller at that rate of movement that is desired. As a more particular feature of this portion of my invention, the rate of movement of the controller by the intermediate or energy storing means is best determined through the utilization of a timer that in the preferred form of my invention is a dashpot.

As a further feature of my invention, the controller is equipped with an index mechanism for maintaining it yieldingly in any speed position, with the feature that the indexing mechanism is released by the application of the brakes of the truck, thereby allowing a return movement of the controller to neutral through spring pressure normally urging the controller towards its neutral position.

Still a further feature of the invention resides in the utilization of positive means for effecting the return of the controller to its neutral position, it being appreciated that these positive means in no way interfere with the movement of the controller to speed positions through the energy storing or spring mechanism just described. Even more particularly, positive means are utilized for limiting the movement of the controller under the influence of the spring or energy storing means.

I have thus outlined rather broadly the more important features of my invention, in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized by those skilled in the art as a basis for the designing of other structures for carrying out the several purposes of my invention. It is important, therefore, that the claims to be granted me shall be of sufficient breadth to prevent the appropriation of my invention by those skilled in the art.

Referring now to the drawings, Fig. 1 is a front view looking toward the operator's platform of a modern industrial truck. Fig. 2 is a side view of the structure of Fig. 1. Fig. 3 is a view of the controller of the truck shown in Fig. 1 with the cover plate removed from the speed portion thereof and with the directional portion of the controller shown in section. Fig. 4 is a section taken along lines 4—4 of Fig. 3. Fig. 5 is a horizontal section taken through the controller. Figs. 6, 7, and 8 are sections taken respectively along lines 6—6, 7—7, and 8—8 of Fig. 3. Fig. 9 is a perspective view of the index release mounted about a sleeve actuated by the brake treadle.

Figure 14:
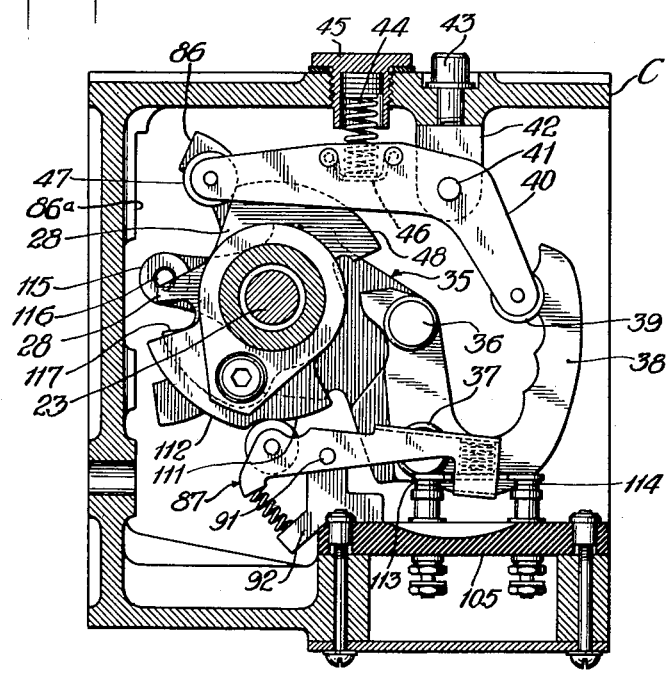
Figure 15:
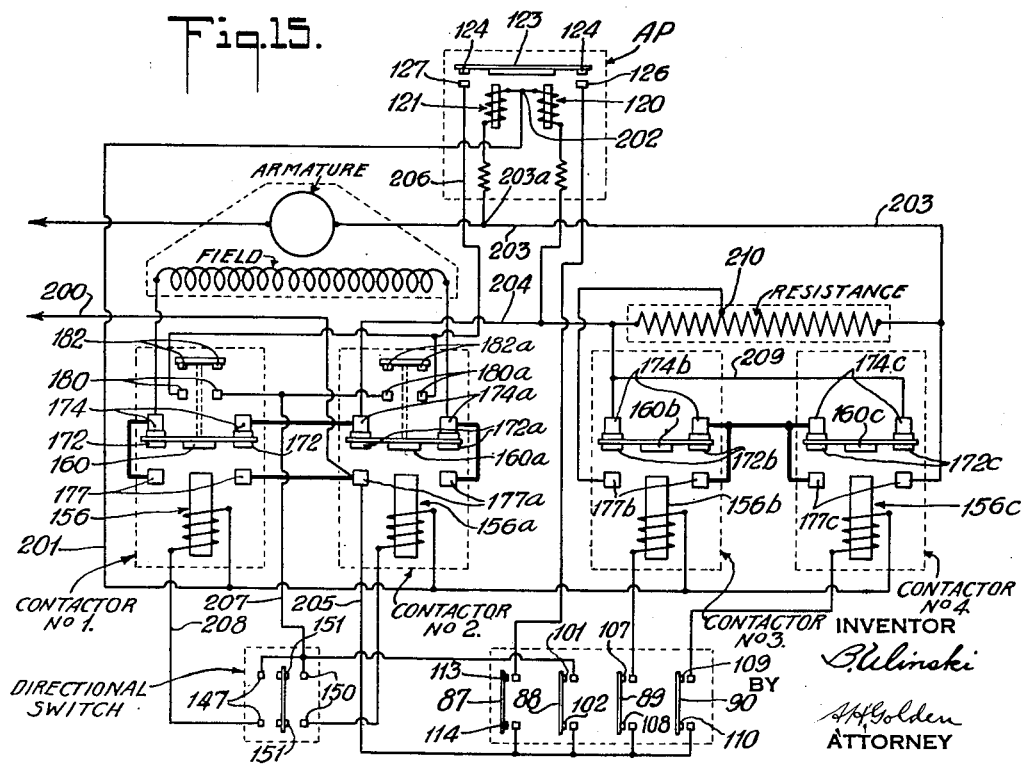

Fig. 10 is a perspective view of a switch operating cam rotatable with the index release. Fig. 11 is a perspective view of what I term the primary actuator. Fig. 12 is a perspective view of the controller cam carrier. Fig. 13 is a perspective view of the controller cams adapted to be carried by the carrier. Fig. 14 is a view similar to Fig. 7, but showing the parts in a different operating position. Fig. 15 is a diagram of the electric circuit of my invention. Fig. 16 is a side view and partial section of one of the contactors used as part of my invention. Fig. 17 is a section taken along line 17—17 of Fig. 16. Fig. 18 is a view looking at the mechanism of Fig. 16 in the direction of the arrow 18 of Fig. 16.

Referring now more particularly to the drawings, and especially Figs. 1 and 2, the truck to which my invention is applied is designated by the letter T and is equipped with the usual operator's platform P. The steering of the truck is accomplished by a steering lever S although a steering wheel may be used. Pivoted to the truck are a pair of treadles, one being marked B because it is the brake treadle, while the other is marked with the letter O because it is the operator's safety treadle.

It will be noted that the treadle B is pivoted at 10 and is connected by a rod 11 to arm 12 extending from a sleeve 13 on which is secured a second arm 14. Pivoted to the arm 14 is a rod 15 that in turn is bifurcated at 16 so that it may be pivoted to the lever 17 best shown in Fig. 9. The lever 17 is formed with bores 19 and 19a so that the rod 15 may, through its bifurcated portion 16 be pivoted either along the axis of the bore 19 or upon the axis of the bore 19a. It will, of course, be appreciated that the treadle B is normally maintained by the spring 20 and rod 20a in its position of Figs. 1 and 2, rod 20a being suitably pivoted to sleeve 13. The lever 17 is normally held by treadle B therefore in a position wherein the parts rotatable therewith are positioned as in Fig. 7. Further explanation of this portion of the invention will be given later.

The foot treadle O is pivoted to the truck in somewhat the same manner as is the treadle B and is adapted to actuate a rod 21 that is adapted to extend into the controller casing as shown in Fig. 6 and then to extend from the controller casing into the directional switch casing also shown in Fig. 6. Further reference to the rod 21 will be made hereinafter. At this point, it is merely necessary to know that when the treadle O is in a depressed position, the rod 21 will be in its full upward position illustrated in Fig. 6. When the operator allows treadle O to move upwardly under the influence of spring 21a, then rod 21 will move downwardly from its position in Fig. 6 for a purpose to be indicated presently.

Referring now more particularly to Figs. 3 to 13 inclusive, the controller casing is designated by reference letter C and is adapted normally to have its forward end closed as by a cover 22 best shown in Fig. 1. A shaft 23 is adapted to rotate within the casing, being supported at its right end as best illustrated in Fig. 5 by needle bearings 24 extending between the shaft and the casing C. At its left end the shaft 23 is supported through needle bearings 25 relatively to a sleeve 26 best illustrated in Fig. 9. This sleeve 26 is fixed to the lever 17 through the intermediary of a bolt 27 best shown in Fig. 5.

Through suitable means an index release 28 best shown in Fig. 9 is secured for rotation integrally with sleeve 26, it being understood that, if desired, the index release 28 could be formed integrally with the sleeve 26. For the purpose of facilitating fabrication the parts have been designed as illustrated in the drawings and as will be described. However, the fabrication may take place in any desired manner, all depending upon the prevailing processes. Secured also to the sleeve 26 for rotation integrally therewith is the switch cam 29 best shown in Fig. 10. This cam may be secured to the sleeve 26 as by a screw entering the bore 30 of the cam and extending into the threaded bore 31 of the sleeve. To insure its proper assembly, the cam 29 may have a further bore 32 for a bolt 33 that will extend into the threaded bore 34 of the index release 28.

Mounted about the shaft 23 just to the right of the index release 28 is what I choose to call a primary actuator, designated generally by reference numeral 35 and best shown in Fig. 11. This primary actuator is preferably fabricated of at least two castings maintained assembled by a pair of studs 36 and 37. The primary actuator has formed as an integral part thereof an index plate 38 that is adapted for cooperation with an index roller 39 that is mounted on an index lever 40 best seen in Fig. 7. The index lever 40 is in turn pivoted at 41 on a bracket 42 secured by a stud 43 to the casing C of the controller. A spring 44 presses at one end against a plug 45 threaded into the casing C, the spring pressing at its other end against a bracket 46 formed integrally with the lever 40, thereby tending to rotate the lever 40 in a counter-clockwise direction in Figs. 7 and 14. A second roller 47 is carried at the left hand end of the lever 40 and is adapted to coact with the surface 48 of the index release 28 as will later be indicated in more detail.

Rotatable on the shaft 23 just to the right of the primary actuator 35 is the controller cam carrier 49 best seen in Fig. 12, formed partially as a sleeve 50 and partially as a flange 51. Extending from the flange 51 is a pin 52 to which is secured one end 53 of a spring 54. The other end of the spring 54 is secured to the stud 37 of the index plate 38 of the primary actuator 35. The controller cam carrier 49 is freely mounted about the shaft 23, but the primary actuator 35 is secured for integral rotation with the shaft 23 through the intermediary of the bolt 55, best shown in Fig. 8, the nut securing the said bolt being designated by numeral 56.

It will now be appreciated that rotary movement of the primary actuator 35 with the shaft 23 in a clockwise direction in Figs. 7, 8 and 14 will effect an elongation of the spring 54, and the spring 54 will then tend to rotate the controller cam carrier 49 also in a clockwise direction. A shoulder 57 on the primary actuator coacts with a surface 58 of the flange 51 of the carrier 49 so as to limit the clockwise movement of the carrier to the extent of movement of the primary actuator itself. It will also be appreciated that while clockwise movement will be imparted to the carrier by the actuator through the intermediary of the spring 54, the return or counter-clockwise movement of the carrier will be effected through contact of the actuator shoulder 57 with the carrier surface 58.

Mounted about the sleeve 50 of the carrier 49 are the three controller cams designated generally by the single reference numeral 59, and best illustrated in Fig. 13. The extreme left cam is formed with a switch closing portion 60 having a dwell 60a. The central cam is formed with a switch closing portion 61 having double length dwell 61a. The extreme right controller cam is formed with a switch closing portion 62 having also a double length dwell 62a. The three cams 59 are adapted to be secured for rotation integrally with the controller cam carrier 49 and for that purpose a composite bore 63 is formed in the two right hand cams for the passage of a bolt that extends into the threaded bore 64 of the sleeve 50. The extreme left hand controller cam 59 of Fig. 13, as well as the two right cams 59, are secured to the flange 51 of the carrier as by a threaded bolt 65 entering the threaded opening 66 of the said flange 51. It will be readily appreciated that any means for securing the three cams to the sleeve 50 and carrier 49 will be acceptable.

Mounted between the extreme left cam 59 and the central cam 59 in the space indicated by the reference numeral 67, is a lever 68 best shown in Fig. 6. The lever 68 is adapted to be inserted over the sleeve 50 and is preferably secured by the threaded bolt 65 to the cams 59 and to the carrier flange 51. In this way, the lever 68 rotates integrally with the controller cam carrier 49 and the three cams 59.

As best shown in Fig. 6, the lever 68 is bifurcated at 69 for cooperation with a pin 70 of a piston 71 mounted within the dashpot cylinder 72.

It will now be appreciated that the lever 68 will rotate together with the controller cam carrier under the influence of the spring 54 when the primary actuator is rotated clockwise in Fig. 6. The first rotation of the lever 68 will be independent of the pin 70 and the piston 71. Thereafter, however, movement of the lever 68 will move the piston 71 downwardly in the dashpot cylinder 72 so as to be controlled thereby. The flow of air into the cylinder 72 above the piston 71 is through a control valve 73 and suitable passages 74. By a particular positioning of the control valve 73 the resistance to the movement of the piston 71 may be regulated, as those skilled in the art will readily understand, so as to control its speed of movement under the stress of the spring 54. In other words, by the adjustment of the control valve 73, the speed of movement of the controller cam carrier and the cams 59 may be predetermined. However, up to first speed, because of the bifurcated end 69 of lever 68, the dashpot exercises no control over the controller speed.

Movement of the piston 71 upwardly by lever 68 to its neutral position of Fig. 6 is effected by the shoulder 57 of the primary actuator operating against the surface 58 of the flange 51 of the carrier, and is at full speed as the valve mechanism allows for the free escape of air upwardly from the dashpot 72. Those skilled in the art will appreciate that the dashpot construction per se may be of any preferred type so long as it allows for the movement of the piston freely in one direction, and against regulated air or liquid flow in a reverse direction. While I have shown the utilization of a piston adapted to pull air into a dashpot for the purpose of regulation, the regulation may be reversed by controlling the outward movement of the air from the dashpot cylinder under the pressure of the piston. In addition, other timing means may, of course, be utilized.

At its extreme right hand end, the shaft 23 has secured thereto through the bolt 75 and nut 75a, a bracket 76 as best shown in Figs. 3 and 5. To the bracket 76 there is secured a hand lever 77 through the bolts 78 best seen in Fig. 3. It will now be appreciated that upon rotation of the hand lever 77 the shaft 23 will be rotated and will move therewith the primary actuator 35. The primary actuator will in turn apply tension to the spring 54 and through that tension will rotate the controller cam carrier 49. With the controller cam carrier 49 there will be rotated the three switch cams 59 for controlling a series of switch levers in a manner to be set forth hereinafter.

I provide spring means for yieldingly urging the hand lever 77 and the shaft 23 into a predetermined initial and neutral position. These spring means are best disclosed in Figs. 4 and 5. In those figures it will be noted that the bracket 76 has a circular hub 79 that is formed with a series of inwardly projecting slots 80. A coil spring 81 has one end thereof designated by reference numeral 82 fitting into one of the several slots 80. The other end of the spring terminates at 83 and bears against the rounded end of a lever 84 that is in bearing relation at 85 to a surface of the casing C of the controller. The spring is initially wound before being applied as illustrated, so that it tends always to maintain the hand lever 77 and the shaft 23 in their positions illustrated in Figs. 3, 7, and 8. It will be noted in Figs. 7 and 8 that a surface 86 of the primary actuator 35 lies against a limit surface 86a of the casing, thereby limiting the movement of the shaft 23 and the hand lever 77 under the influence of the spring 81.

The index plate 38, formed as part of the primary actuator 35 is adapted for cooperation with the roller 39 of the spring pressed lever 40 for maintaining the primary actuator yieldingly in any position to which it is moved by the hand lever 77. The index release 28, earlier described, is adapted for cooperation with the roller 47 of the lever 40 for moving the index lever 40 from its position of Fig. 14 to its position of Fig. 7, in which position the roller 39 is moved to release the index plate 38 so that the primary actuator and the shaft 23 may return to their initial position of Figs. 7 and 8. This movement of the index release 28 is imparted, of course, by the brake treadle B through the rods 11 and 15 and the lever 17 when the brake treadle is moved to its position of Fig. 1. In other words, whenever the operator removes his foot from the brake treadle B, he releases the index mechanism so that the primary actuator may be returned to its initial or neutral position by spring 81.

Mounted within the controller casing C are four contact making and breaking switch levers 87, 88, 89, and 90. Since these levers and the contacts associated therewith are duplicates, I shall refer to Figs. 3, 5, and 6 to describe the construction of that one lever that I have designated by reference numeral 88, and shall describe also the particular contact mechanism cooperable with this switch lever. Switch lever 88 is formed of sheet metal bent up as illustrated in the drawings and pivoted at 91 to a bracket 92. Its sheet metal sides are bent and drilled to support a cross shaft 93 on which is carried a roller 94 as best seen in Fig. 6. A spring 95 is mounted so as to press at one end against a shoulder 96 of the bracket 92 and at its other end against a surface 97 of the lever 88 whereby to rotate the lever in a clockwise direction about its pivot 91.

A spring 98 is carried within the forward box-like portion formed by the sheet metal body of the lever 88 and presses at its upper end against the surface 99 and at its lower end against a contact bar 100 formed with spaced contacts 101 and 102. These spaced contacts 101, 102 are adapted for cooperation with contacts 103, 104 mounted on an insulation member 105 that is suitably secured within the casing C as best illustrated in Fig. 6. Suitable conductor leads are, of course, adapted to be secured to the contacts 103, 104 at 106 and to be held in position, all as is well illustrated and as will be readily understood by those skilled in the art.

The particular switch lever 88 seen best in Fig. 6 is adapted for cooperation with that particular cam 59 of Fig. 13 that is formed with the surface 60 and the short dwell 60a. It will readily be perceived that when the surface 60 is rotated to bring the dwell 60a opposite the roller 94, the spring 95 will function to press the lever 88 so that its contacts 101, 102 will bridge the stationary contacts 103, 104 to close a circuit. In a similar way, rotation of that cam 59 that is formed with the surface 61 and the double dwell 61a will effect rotation of the switch lever 89 so that its contacts 107 and 108 may move into circuit closing position. The double dwell 62a of the controller cam portion 62 will control the movement of the switch lever 90 so that its contacts 109 and 110 may close a circuit. It is, of course, appreciated that the dwells 60a, 61a, and 62a are spaced circumferentially one from the other so that the switch levers 88, 89 and 90 will be moved in predetermined sequence, all as will be emphasized later in this specification.

The switch lever 87, while constructed, mounted, and adapted for control in the same manner as is switch lever 88, is controlled by the long dwell or depressed surface 111 of the cam 112 formed as a part of the sleeve 29 and rotatable integrally with the index release 28. The relationship of the depressed surface 111 to the index release 28 is such that when the index release operates roller 47 in Fig. 7 to hold the index roller 39 out of indexing position, then the switch lever 87 is positioned so that its contacts 113, 114 are away from switch closing position. When the brake treadle B is depressed to release the brakes, the consequent rotation of the index release cam 28 will effect a rotation of the cam 112 and depressed surface 111 to the position of Fig. 14. In this position of the parts the switch lever 87 is allowed to move under spring pressure to circuit closing position as is readily seen. Thus, the switch lever 87 is brought to circuit closing position by the depression of brake treadle B to release the brake while the remaining switch levers 88, 89, and 90 are brought into circuit closing position by the rotation of the hand lever 77 and the shaft 23.

If desired, the hand lever 77 may be dispensed with and the primary actuator 35 rotated through the medium of the brake treadle B and the index release 28. Similarly, the index release 28 and switch cam 29 may be rotated free of brake treadle B by hand lever 77. It will be noted in Fig. 11 that the primary actuator is formed with a laterally extending arm 115 formed with a threaded bore 116. The index release 28, as best seen in Figs. 5, 9, and 14, is formed with a slot 117. In Fig. 5 I show in phantom a stud 118 that may be inserted into the bore 116 of the arm 115, with the head of the stud lying in the slot 117. In this fashion the index release is secured for rotation integrally with the primary actuator. By connecting the bifurcated end 16 of the rod 15 to the lever 17 through the hole 19 best shown in Fig. 9, rotary movement may be imparted to index release 28 and primary actuator 35 by brake treadle B. The first depression of the brake treadle B will now act to release the brake and close a circuit through the first switch lever 87 and its contacts 113, 114. Further movement of the brake treadle B will act through the primary actuator and spring 54 to rotate the controller cam carrier 49 and its three cams 59. This will operate in sequence the three switch levers 88, 89, and 90. Of course, return of the brake treadle B to its position of Fig. 1 will effect a movement of the index lever 40 to withdraw the index roller 39 from index plate 38 just as previously described.

In a reverse fashion, the brake treadle could be released from the lever 17 and the hand lever 77 would then rotate the several parts sequentially as required as already set forth. There is mounted within the casing C as best seen in Fig. 5 an anti-plugging relay designated generally by reference letters AP, the function of which will hereinafter be set forth. It will here be necessary to indicate merely that this anti-plugging relay utilizes a pair of relays 120 and 121 supported on a bracket 122 suitably secured to the casing C. The armature of this anti-plugging relay is designated by reference numeral 123 and carries contacts 124 and 125 for cooperation respectively with contacts 126 and 127.

As part of my controller I utilize a directional switch that is designated generally by the reference letter D. This directional switch is housed within a casing 128 best illustrated in Figs. 1, 3, and 6. The casing 128 is suitably supported on the casing C of the controller and is formed with an opening 129 for the passage of means secured to the upper end of the rod 21 extending upwardly from the treadle O. The upper end of the rod 21 carries a length adjusting sleeve 130 that is formed with a pair of pins 131 operating in slots 132 of a pair of spaced index plates 133 that are pivoted on a bolt 134 carried by the casing 128. A torsion spring 135 presses against the casing 128 and is bent so as to apply pressure against a bolt 136 carried between the index plates 133 whereby to urge the index plates in a clockwise direction in Fig. 6 about the bolt 134.

A shaft 137 is supported between the index plates 133 and has mounted thereon a roller 138 that coacts with the index dwell 139 of a switch plate 140. This plate 140 is secured for rotation with a shaft 141 that has pinned thereto at 142 a hand lever 143. A spring 144 is mounted between the casing D and the switch plate 140 so as to urge the plate normally into its neutral position of Fig. 6.

An insulation member 145 is supported by studs 146 relatively to the casing 128. Looking at Fig. 6, there is supported at the left hand side of the insulation member 145 a pair of yielding contacts 147 that are maintained spring pressed into proper position by springs 148 held under compression by suitable bolts 149. At the right hand side of the insulation member 145 there are a similar pair of contacts 150. For cooperation with either pair of contacts, that is for cooperation with either the contacts 147 or the contacts 150, the disc 140 has secured thereto opposed contacts 151. It is obvious that rotation of the hand lever 143 clockwise in Fig. 6 will bring the contacts 151 into bridging relation to contacts 147, while counter-clockwise rotation will bring the contacts 151 into bridging relation to contacts 150.

The strength of the spring 135 is such that when the index plates 133 are in the position of Fig. 6 and the lever 143 is rotated, the roller 138 will hold the switch plate 140 and contacts 151 in either a counter-clockwise or a clockwise rotated position. Upon a downward movement of the rod 21 the index plates 133 will be rotated in a counter-clockwise direction in Fig. 6 to withdraw the roller 138. When the roller 138 is so withdrawn, the switch plate 140 and the hand lever 143 will be released for movement under the influence of spring 144 (Fig. 3) to the initial, neutral, and central position of Fig. 6. In other words, the index plates 133 under the influence of the spring 135 are adapted to maintain the switch mechanism within casing 128 in any position to which it is moved when the rod 21 is in its position of Fig. 6. However, upon downward movement of the rod 21 and its enlarged end 130, the switch mechanism will be released from roller 138 to move to the open position of Fig. 6 from either a counter-clockwise or clockwise rotated position. Actually, this withdrawal of index roller 138 takes place when the operator steps off the treadle O.

The controller mechanism herein described is adapted for cooperation with contactors, and for a description of one of the contactors, reference is now made to Figs. 16, 17, and 18. There it will be noted that each contactor comprises a heavy U frame 155 to which is bolted a coil 156 through the medium of a bolt 157. Sheet metal brackets 158 are secured to the U frame 155 through bolts 158a, and these brackets are formed with holes 159 whereby the contactor may be bolted in proper operating position on the truck. The armature of each contactor is a simple piece of iron bent in general L shape form as can best be seen from Fig. 16, the armature there being designated by reference numeral 160. A threaded pin 161 is formed with a head 162 whereby it is secured to the U member 155, passing through a bore 163 of this U member 155.

The armature 160 is formed with a cup-shaped depression 164 and a bore 165 through which passes the threaded pin 161. A spring 166 is positioned about pin 161 so that one end thereof lies within the cup-shaped depression 164 while the outer end thereof is pressed against a disc 167 that is threaded onto the end of the pin 161. By rotating the disc 167 the initial compression of the spring 166 may be varied, thereby varying the force with which the armature is maintained in its position of Fig. 16, that being the position when the coil 159 is de-energized.

A pair of studs 168 secure to the armature 160 a hollow box-like member 169 having an integral arm 170 extending laterally therefrom. Of course, suitable insulation means are utilized, as is well shown in the drawings, to insulate the member 169 and its arm 170 from the armature 160. Mounted within the box-like member 169 is an upper contact bar 171 and a lower contact bar 172, the two bars being maintained separated by a spring 173 and pressed thereby toward the end surfaces 169a and 169b of the box-like member 169. Cooperating with the contact bar 171 are a pair of contacts 174 suitably secured by bolts 175 and nuts 176 to portions of the brackets 158 and insulated therefrom. For cooperation with the lower contact bar 172 the brackets 158 carry contact members 177 secured relatively thereto in the same manner as are the contacts 174. Naturally, extending to the contacts 174 and 177 will be suitable leads as those skilled in the art will appreciate, and as will be further indicated hereinafter.

At this point it will be well to emphasize that when the armature 160 is in its position of Fig. 16 because the coil 156 is de-energized, the bar 171 carried by the armature is yieldingly maintained in contact making position relatively to contacts 174. Thus, the spring 166 presses the armature 160 so as to rotate the armature and its box-like member 169 whereby through the spring 173 to apply pressure against contact bar 171. It will be noted in Fig. 16 that when the contact bar 171 is in contact making position the spring 173 is somewhat compressed. This is a very helpful condition because, when the coil 156 is thereafter energized to rotate the armature 160 to the position indicated by the dot and dash line 160a of Fig. 16, the initial compression of the spring 173 will help to overcome the resistance of spring 166 to this movement of the armature. In other words, when the armature is at its greatest distance from the coil so that the coil is least efficient, the spring 173 helps the coil to do its work.

It will be noted that when the armature is in its dash and dotted line position designated by reference numeral 160a there will be a space between it and the core of the coil 156. Therefore, there will be a break in the magnetic lines of flux so that when the circuit of the coil 156 is broken the spring 166 will be effective to snap the armature back to its position of Fig. 16. This is an important feature and obviates the need for insulation between armature 160 and coil 156.

When the coil 156 is energized, the armature 160 will swing downwardly bringing the bar 172 into bridging relation to the contacts 177. The contacts will be maintained in this bridged relation through the medium of the pressure of spring 173 as has already been indicated. With the armature in the downward position for closing a circuit through contacts 177, an auxiliary or control circuit will be closed through a pair of contacts 180 suitably carried and insulated from the brackets 158. The contacts 180 are bridged by legs 182 of a spring-like brass plate 183 that is secured to the armature 160 by the same studs 168 that hold the box-like member 169 to the armature. Of course, suitable insulation means are provided for insulating the plate 183 from the armature and the other mechanism associated therewith.

I shall now refer to Fig. 15 for the purpose of describing the complete operation of the mechanism I have set forth in detail above. In Fig. 15 the armature of the traction motor that is controlled by the means set forth is designated by the word "Armature" while the field is designated by the word "Field." The resistance for controlling the speed of operation of the motor is noted as "Resistance" in the drawings. Each of the four contactors employed by me, one having been described by me with reference to Figs. 16, 17, and 18, is outlined by dotted lines, and the four contactors are named contactor No. 1, contactor No 2, etc. It will be noted that two of the contactors are equipped with the plate 183 having contact legs 182, while two of the contactors do not have such means. It will also be noted that while the extreme left contactor bears the same reference numerals as the contactor described with reference to Figs. 16, 17, and 18, the remaining contactors bear the said reference numerals with the additional letter, "a," "b," and "c." For simplicity, the two bars 171, 172 of each contactor are combined as a single bar 172, since functionally they serve as a single bar for bridging the opposed pairs of contacts.

With the controller in neutral position and both the hand levers 143 and 77 positioned as in Fig. 3 and the foot treadles positioned as in Fig. 1, the operator steps on the truck platform P and in order to start the truck he will depress the brake treadle B. This depression of the brake treadle will effect the rotation of the index release 28 whereby to permit the index lever 40 to move to its position of Fig. 14 under the pressure of spring 44. In this position the index plate 38 will be maintained yieldingly in any position to which it is moved by the primary actuator 35 of which it is an integral part. The movement of the index release effects also the movement of the switch cam 29 and its portion 112 so as to bring the dwell or depressed surface 111 opposite the roller 94 of the switch lever 37. The spring 95 will immediately effect a movement of the lever 87 to close a circuit at 113, 114. At the same time, the operator will depress the treadle O bringing the roller 138 of the index plates 133 (Fig. 6) into indexing relation at 139 relatively to switch plate 140 of the direction controller D.

Thereafter, the operator will rotate the direction controller D so as to bring the contacts 151 into bridging relation relatively to the contacts 147 or the contacts 150. We will first assume that the operator wishes to go in a forward direction and that to do this the contacts 151 must bridge contacts 147. The motor will not as yet start even when all this is accomplished because the circuit of both contactors 156, 156a is broken at the anti-plugging switch designated AP in Fig. 15. In addition, neither of the contactor coils 156, 156a is excited because the control circuits of each of the contactors is open at 180, 182. Actually, it is impossible to excite either of the coils 156 or 156a except through a circuit in shunt relation to the coil AP and control points 182, 180, and 182a, 180a. Closing of this shunt circuit is accomplished by moving the hand lever 77 to a position wherein the dwell 60a is brought opposite the roller 94 of switch lever 88. It will be noted that dwell 60a is very short, while dwell 111 is really a depressed surface and runs for the entire distance of the cam 112 from the point where the dwell begins. Therefore, while dwell 60a allows switch lever 88 to move to closed position through the rotation of the cams 59 to a predetermined position, dwell 111 is of such length as to allow switch lever 87 to remain closed in all rotated positions of the surface 112 beyond the position illustrated in Fig. 14.

With the switch lever 88 in circuit closing position, a circuit will be closed at 101, 102. Current will now flow as follows: From the power source through conductor 200 to left contact 177a, conductor 205, contact 102 and contact 101 to the directional switch. There, because the directional switch was closed to bring contacts 151 in bridging relation to contacts 147, current will flow across contacts 147 to contactor coil 156, conductor 201 to point 202 in the anti-plugging coil. From that point current will flow through the coils 120 and 121 in parallel, inducing a magnetic flux that will bring the armature 123 downwardly. From coil 121 the current will flow into the conductor 203 and then to the armature. From coil 120 the current will flow to the conductor 204 and then through the resistance into the armature.

Since contactor coil 156 is now energized, its armature 160 will pivot downwardly so as to bring contacts 172 into bridging relation to stationary contacts 177. A traction circuit will now be closed through the motor bringing the motor into first speed. This traction circuit is as follows: Conductor 200, left contact 177a to contacts 177 bridged by contacts 172 of the armature 160. Then to the left contact 174, through the field to right contact 174a, across contacts 172a of armature of 160a to left contact 174a to conductor 204. Since neither the third or fourth contactor coils 156b or 156c are excited, the current will then go from conductor 204 through all of the resistance and then to conductor 203 and the armature of the motor to the current source. Thus, the circuit of the motor will be established through all of the resistance and the motor will be in first speed.

Simultaneously with the establishment of the motor circuit as above set forth through the energizing of the first contactor coil 156 for one direction, or the energizing of the second contactor coil 156a for the reverse direction, there will be energized a circuit in by-pass relation to the switch contacts 101, 102 of switch lever 88. It will be recalled that switch lever 88 is moved to circuit closing position when the speed operating lever 77 is rotated to move that cam 59 that has the dwell 60a. The by-pass circuit referred to is as follows: From conductor 200 to the left contact 177a, conductor 205, across contacts 113, 114 of switch lever 87 and to the contact 126 of the anti-plugging relay AP. It will be recalled that the coils 120 and 121 were first energized by the movement of switch lever 88 to bring contacts 101, 102 into switch closing position and that the armature 123 of the anti-plugging coil was therefore moved downward with its contacts 124 positioned in bridging relation to contacts 126, 127. The circuit will therefore continue across contacts 126, 127 and conductor 206 to contacts 180 and across those contacts because the armature 160 has been moved downwardly to bring contacts 182 into bridging relation to the contacts 180.

The circuit will then continue through conductor 207 and across the left contacts 147 in the directional switch. From there the circuit will continue through conductor 208 to coil 156, conductor 201 into coils 120, 121, energizing those coils so that their magnetic pull will be in the same direction as when they were first energized through switch lever 88. The circuit will then continue through coil 121 into conductor 203 and the armature. The circuit through coil 120 will continue into conductor 204 and thence through the resistance into the armature. It is thus seen that once the first speed circuit has been closed through the prerequisite movement of the lever 88 as earlier described, the consequent movement of one of the contactor relays 156, 156a to close a circuit across contacts 180 or 180a through the downward movement of the armatures of either of coils 156, 156a, will effect the maintenance of a closed circuit through either of the said coils 156, 156a independent of the switch lever 88.

Through this relationship of the parts the further rotation of the cam carrier may open the circuit closed by the switch lever 88 without disturbing the circuit established through the contactor coil 156 or the contactor coil 156a. Thus, if the speed handle 77 is rotated now so as to bring the short dwell 60a of switch cam 60 away from the roller 94 of switch lever 88, the circuit will be opened at 101, 102, but the circuit of coil 156 will remain closed and the truck will continue to move forward. The rotation of cams 59 will bring dwell 61a into position to allow movement of switch lever 89 to close a circuit across contacts 107, 108, while dwell 111 will allow the lever 87 to remain in circuit closing position. This will effect the energizing of the coil 156 of contactor No. 3 and the downward movement of the armature 160b to close a circuit across contacts 177b. A circuit will now be closed through the field of the motor as earlier described into conductor 204. However, the circuit will now not extend through the entire resistance but instead will go from conductor 204 into conductor 209 and across the bridged contacts 174c. Thence the circuit will extend to bridged contacts 177b bridged by the downward movement of the armature 160b. From this point the circuit will run to point 210 of the resistance and through the remainder of the resistance into conductor 203 and through the armature. The circuit now established will be the second speed circuit.

A still further rotation of the speed lever 77 will bring the dwell 62a of the third cam 59 into position to release switch lever 90 for bridging a circuit at 109, 110. However, the dwell 61a is of sufficient length so that the switch lever 89 will remain in that position just described above in which contacts 107, 108 are in bridging position. Lever 87 remains, of course, in circuit closing position. Therefore, coils 156b and 156c will both be energized and contacts 177b and 177c will be bridged. The circuit will now extend from the field into the conductor 204, through the resistance to point 210 and then to bridged contacts 177b and bridged contacts 177c to conductor 203 and the armature. The circuit thus established is through but a small portion of the resistance and is what I term the third speed circuit.

If the speed lever is now rotated still further, the dwell 61a will move beyond the roller of switch lever 89 so as to open the contacts at 107, 108. However, a circuit will remain established at 109, 110 because of the continued positioning of the switch lever 90 in bridging relation, the dwell 62a being sufficiently long for that purpose. The circuit now established will be through the field into conductor 204 and thence across bridged contacts 174b, bridged contacts 177c and into conductor 203 and the armature. All of the resistance will now be shunted so that a full speed circuit is now established as will be readily appreciated. Those skilled in the art will understand now just how it is possible by the novel contribution of my invention to obtain a four speed and directional control of my motor with the minimum number of contactors I utilize.

With either a second, third, or fourth speed circuit established, the switch lever 88 will be positioned so that its contacts 101, 102 are not in circuit closing position. Now, bearing this point in mind, it is important to see what happens if the operator moves his directional switch to reverse the direction of movement of the truck while the truck is running in second, third, or fourth speed. Immediately upon an opening of the circuit at contacts 147 by the movement of the contacts 151, the contactor coil 156 will be de-energized and the circuit will be opened at contacts 180 through the upward movement of the armature carrying the contacts 182. When the contacts 151 then move into bridging relation to contacts 150 for a reverse direction operation the contacts 180a are unbridged. Simultaneously, the anti-plugging coils 120, 121 have become unexcited and the armature 123 has moved to the position of Fig. 15 so that the contacts 124 are no longer in circuit closing position. Therefore, it is impossible to close the circuit of coil 156a to reverse the direction of movement of the truck.

Only by returning the speed lever 77 to first speed position, in which position switch lever 88 closes a circuit at 101, 102, can a closing of the motor circuit be effected for reversing its directional operation. Thus, with a circuit closed at 101, 102, the anti-plugging coils 120, 121 will be again energized so as to close the circuit through contacts 126, 127. The energizing of the coil 156a will then effect a bridging of the contacts 180a so that the circuit of contactor 156a remains closed even after switch lever 88 is thereafter moved away from bridging position.

It is important to consider that no directional circuit can be closed through the motor by the simultaneous actuation of contactors 156, 156a. Therefore, contactors 156 and 156a may be said to be inherently interlocked. This is extremely important because it does away with the necessity for providing either mechanical or electrical interlocking means between the contactor coils. The circuit established through the field when contactor 156 is energized has already been indicated as from conductor 200 through bridged contacts 177, the field, and then through bridged contacts 174a to conductor 204. With contactor 156a excited, the directional circuit will be through conductor 200 across bridged contacts 177a through the field in a reverse direction, then bridged contacts 174 to the left contact 174a and toward the resistance. Thus, for drive in one direction, the circuit is closed through the contacts bridged by the energizing of one contactor coil and through the contacts bridged when the other coil remains de-energized. For reverse directional operation the opposite is true. Thus, one coil must always be energized and the other coil de-energized.

It will be recalled that the magnetic flux in the coils 120, 121 is downwardly in Fig. 15 when those coils are energized by the controller operation. Therefore, armature 123 is brought downwardly to place contacts 124 in bridging relation to contacts 126, 127. It is important to consider this relationship of the parts because this relationship is utilized to prevent the operator reversing the motor to brake the truck. For preventing this particular abuse of the truck, I utilize also the arrangement of coil 121 in a position to receive any current generated by the armature of the motor when coasting this generation of current being in a direction upwardly from contact point 203a in Fig. 15 when the motor is generating current through running downhill.

Let us now consider that the motor is running downhill and the current is being generated as indicated. If the slope is sufficiently long, the operator will have an opportunity to move into first speed and then into second, third, and fourth speeds. However, the current being generated by the motor will traverse the coil 121 in a direction so that its magnetic flux will be opposite the direction in which the current and magnetic flux is induced in coil 120. Thus, there will be insufficient magnetic pull to maintain armature 123 so that its contacts 124 bridge contacts 126, 127. Therefore, as soon as the operator reaches second speed position or higher, with the contacts 101, 102 out of bridging position, the circuit opening movement of the armature 123 will break the circuit of that contactor 156, 156a that happens to be energized. This will immediately open the motor circuit as has already been indicated. In first speed position the motor may be used as a brake because the circuit of coil 120 and the circuit of either of the contactors 156, 156a is established through contacts 101, 102 rather than through the contacts 124 of the armature 123. However, the plugging of the motor, as the industry terms the utilization of the motor as a brake, will not be harmful in the first speed position.

I believe that the operation of my invention and the mechanism by me described will now be clear to those skilled in the art.

I now claim:

1. In a controller, operating mechanism, circuit controlling means mounted for movement, energy storing means positioned between said operating mechanism and circuit controlling means and through which said operating mechanism moves said circuit controlling means in one direction, a timing mechanism for controlling the speed of movement of said circuit controlling means in said one direction by said energy storing means, and abutments through which said operating mechanism moves said circuit controlling means in the opposite direction.

2. In a controller, operating mechanism, circuit controlling means mounted for rotation in said controller, a spring extending between said circuit controlling means and said operating mechanism and through which said operating mechanism rotates said circuit controlling means in one direction, a dashpot mechanism actuated by said circuit controlling means for controlling its speed of movement by said spring, and means whereby said operating mechanism rotates said circuit controlling means opposite to said one direction.

3. In a controller, operating mechanism, circuit controlling means mounted for rotation in said controller, a spring extending between said circuit controlling means and said operating mechanism and through which said operating mechanism rotates said circuit controlling means in one direction, a dashpot mechanism actuated by said circuit controlling means for controlling its speed of movement by said spring in said direction, and abutments through which said operating mechanism moves said circuit controlling means in the opposite direction.

4. In a controller, operating mechanism, circuit controlling means mounted for rotation in said controller, a spring extending between said circuit controlling means and said operating mechanism and through which said operating mechanism rotates said circuit controlling means, a dashpot mechanism actuated by said circuit controlling means for controlling its speed of movement by said spring, and a lost motion connection between said circuit controlling means and said dashpot mechanism whereby the first movement of said circuit controlling means is independent of said dashpot.

5. In a controller, a casing, a shaft rotatable in said casing, means for rotating said shaft, a primary actuator secured to said shaft, a circuit closing means mounted for rotation about the axis of said shaft but independently thereof, spring means secured between said primary actuator and said circuit closing means whereby said primary actuator yieldingly rotates said circuit closing means in one direction, timer mechanism for controlling the speed of rotation of said circuit closing means by said spring means, and means whereby said means for rotating said shaft rotates said circuit closing means opposite to said one direction independently of said timer mechanism.

6. In a controller, a casing, a shaft rotatable in said casing, means for rotating said shaft, a primary actuator secured to said shaft, a circuit closing means mounted for rotation about the axis of said shaft but independently thereof, spring means secured between said primary actuator and said circuit closing means whereby said primary actuator yieldingly rotates said circuit closing means in one direction, a dashpot mechanism, a part of said dashpot mechanism connected for movement by said circuit closing means to control its speed of rotation by said spring, and means whereby said means for rotating said shaft rotates said circuit closing means opposite to said one direction.

7. In a controller, a cam carrier, means rotatably mounting said cam carrier for rotation, a series of switch controlling cams rotatable integrally with said cam carrier, a series of switch levers, spring means pressing said switch levers toward switch closing position, said cams having surfaces for preventing movement of said switch levers to switch closing position, said cams having dwells which when moved to predetermined positions release said switch levers for movement to switch closing position, said dwells being of varying lengths and angularly spaced for controlling the movement of said switch levers to switch closing position in predetermined combinations as said cams rotate with said cam carrier, an operator for rotating said cam carrier, movement imparting means between said operator and said cam carrier and through which said operator imparts movement to said cam carrier, and a timing mechanism for controlling the speed of movement of said cam carrier by said movement imparting means.

8. In a controller, a cam carrier, means rotatably mounting said cam carrier for rotation, a series of switch controlling cams rotatable integrally with said cam carrier, a series of switch levers, spring means pressing said switch levers toward switch closing position, said cams having surfaces for preventing movement of said switch levers to switch closing position, said cams having dwells which when moved to predetermined positions release said switch levers for movement to switch closing position, said dwells being of varying lengths and angularly spaced for controlling the movement of said switch levers to switch closing position in predetermined combinations as said cams rotate with said cam carrier, an operator for rotating said cam carrier, energy storing means between said operator and said cam carrier and through which said operator imparts movement to said cam carrier, and a timing mechanism for controlling the speed of movement of said cam carrier by said energy storing means.

9. In a controller for the circuit of an electric motor, a plurality of contactors, a rotating control member, cams rotatable with said control member, circuits for operating said contactors, means whereby continuous rotation of said cams in one direction effects the sequential closing and opening of the circuits of predetermined combinations of said contactors, an operator for rotating said control member, movement imparting means between said operator and said control member and through which said operator imparts movement to said control member, and a timing mechanism for controlling the speed of movement of said control member by said movement imparting means.

10. In a controller for the circuit of an electric motor, a plurality of contactors, a rotating control member, cams rotatable with said control member, circuits for operating said contactors, means whereby continuous rotation of said cams in one direction effects the sequential closing and opening of the circuits of predetermined combinations of said contactors, an operator for rotating said control member, energy storing means between said operator and said control member and through which said operator imparts movement to said control member, and a timing mechanism for controlling the speed of movement of said control member by said energy storing means.

11. In a controller for controlling a plurality of speed circuits of an electric motor, a moving control member, means whereby the movement of said control member in one direction from a predetermined position closes sequentially each of the said plurality of speed circuits, the said circuits being open when said control member is in said predetermined position, an operator for moving said control member from said predetermined position in said one direction to close sequentially said plurality of circuits, energy storing means between said operator and control member through which said operator imparts said movement to said control member, a timing mechanism for controlling the speed of movement of said control member by said energy storing means, and means whereby said operator returns said control member to said predetermined position independently of said timing mechanism.

12. In a controller for controlling a plurality of speed circuits of an electric motor, a moving control member, means whereby the movement of said control member in one direction from a predetermined position closes sequentially each of the said plurality of speed circuits, the said circuits being open when said control member is in said predetermined position, an operator for moving said control member from said predetermined position to close sequentially said plurality of circiuts, energy storing means between said operator and control member through which said operator imparts movement to said control member, and a timing mechanism for controlling the speed of movement of said control member by said energy storing means.

13. In a controller for controlling a plurality of speed circuits of an electric motor, a rotating control member, means mounting said control member for rotation, means whereby the rotation of said control member in one direction from a predetermined position closes sequentially each of the said plurality of speed circuits, the said circuits being open when said control member is in said predetermined position, a manually actuated operator for rotating said control member from said predetermined position to close sequentially said plurality of circuits, energy storing means between said manually actuated operator and said control member through which said operator imparts rotation to said control member, and a timing mechanism for controlling the speed of movement of said control member by said energy storing means.

BRONISLAUS I. ULINSKI.

REFERENCES CITED

The following references are of record in the file of this patent:

UNITED STATES PATENTS

| Number | Name | Date |
|---|---|---|
| 693,355 | Springer | Feb. 11, 1902 |
| 731,375 | Liggett | June 16, 1903 |
| 778,825 | Hill | Dec. 27, 1904 |
| 928,547 | Schureman | July 20, 1909 |
| 968,468 | Halblieb | Aug. 23, 1910 |
| 969,585 | White et al. | Sept. 6, 1910 |
| 1,412,589 | Zweigbergh | Apr. 11, 1922 |
| 1,495,612 | Rockwell | May 27, 1924 |
| 1,625,773 | Park | Apr. 19, 1927 |
| 1,832,116 | Heising et al. | Nov. 17, 1931 |
| 2,148,472 | Joy | Feb. 28, 1939 |
| 2,233,533 | James | Mar. 4, 1941 |
| 2,242,362 | Marbury | May 20, 1941 |
| 2,280,377 | Clarke | Apr. 21, 1942 |
| 2,354,965 | Ostermann et al. | Aug. 1, 1944 |
| 2,445,450 | Narbutovskih | July 20, 1948 |